(12) United States Patent
Nonez et al.

(10) Patent No.: US 9,032,331 B2
(45) Date of Patent: May 12, 2015

(54) VISUAL WIDGET SEARCH

(75) Inventors: Yvon R. Nonez, Orleans (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 13/074,954

(22) Filed: Mar. 29, 2011

(65) Prior Publication Data
US 2012/0254799 A1 Oct. 4, 2012

(51) Int. Cl.
G06F 3/048 (2013.01)
G06F 3/0483 (2013.01)
G06F 3/0485 (2013.01)

(52) U.S. Cl.
CPC ............ G06F 3/0483 (2013.01); G06F 3/0485 (2013.01)

(58) Field of Classification Search
CPC ...... G06F 3/048; G06F 3/0485; G06F 3/0483
USPC .................................................. 715/823, 802
See application file for complete search history.

(56) References Cited

U.S. PATENT DOCUMENTS

| | | | |
|---|---|---|---|
| 5,305,435 A * | 4/1994 | Bronson | 715/777 |
| 2008/0168367 A1 | 7/2008 | Chaudhri et al. | |
| 2009/0049381 A1 | 2/2009 | Robertson et al. | |
| 2009/0217198 A1 | 8/2009 | Jung | |
| 2010/0306702 A1 * | 12/2010 | Warner | 715/811 |

* cited by examiner

*Primary Examiner* — Andrea Leggett
(74) *Attorney, Agent, or Firm* — Janaki K. Davda; Konrad, Raynes, Davda & Victor LLP

(57) ABSTRACT

A technique for a visual search sets a transient mode on, gathers objects to form a pile of objects, wherein each object has a predefined portion visible, and determines whether a selector is over the predefined portion of an object in the pile of objects. Responsive to a determination that the selector is detected over the predefined portion of the object in the pile of objects, the object is presented in a foreground. It is determined whether the object in the foreground is selected to form a selected object. Responsive to a determination that the object in the foreground is selected to form a selected object, the pile of objects is restored to an original state with the selected object scrolled into view within the predefined display area.

18 Claims, 10 Drawing Sheets

VISUAL WIDGET SEARCH

BACKGROUND

1. Technical Field

This disclosure relates generally to a mashup in a user interface of a data processing system, and, more specifically, to visually searching for a widget in a populated mashup of a user interface in the data processing system.

2. Description of the Related Art

A mashup may be described as an application (e.g., a Web application) that combines multiple services into a single application or combines data from multiple sources. For example, the mashup may combine data from two sources (e.g., overlaying map data from one source with store location data from another source). In a data processing environment, when a mashup has a large number of widgets, only a small portion of the widgets can be visible within a display area at any given time. A widget may be described as a representation (e.g., an image, a graphic or icon) representing an application or data set. Finding a specific widget from among the widgets available may be difficult because a user does not know exactly where to scroll to locate the desired widget.

One previous solution to the problem allows the user to zoom out the mashup enough to fit the mashup on the screen. The widgets may be scaled or clipped to fit with a defined display area. However, finding the desired widget may be impossible when the widgets are too small to discern individually. The user may resort to scrolling through the application anyway.

Another method of finding widgets includes a search or find functionality. The search typically requires more steps because the user has to type enough information in the search field to uniquely identify the widget. The identification relies on the user remembering enough textual information in the widget to uniquely identify the specific widget.

In another previous solution, widgets are arranged in a stack or cascade on a dashboard to fit the number of widgets into the available display area. The solution arranges the widgets into a smaller space. However, a user is still required to move the widgets and either moves the widget out of the stack or uses a menu based process to access the widget. In a variation using the stack, only the top widget is visible and may be changed using a slide show effect to present the different widgets to the user. Stacking or cascading techniques typically change the visual orientation and physical placement relationship among the widgets of interest. Previous solutions typically describe ways to fit more content in the available space, either by cascading the widgets, or by scaling the widgets. The previous solutions typically represent permanent changes in the dashboard layout. An easy to use reliable method of locating a widget without changing a dashboard layout is required.

SUMMARY

According to one embodiment, a computer-implemented process for a visual search sets a transient mode on, gathers objects to form a pile of objects, wherein each object has a predefined portion visible and determines whether a selector is over the predefined portion of an object in the pile of objects. Responsive to a determination that the selector is detected over the predefined portion of the object in the pile of objects, the computer-implemented process presents the object in a foreground and determines whether the object in the foreground is selected to form a selected object. Responsive to a determination that the object in the foreground is selected to form a selected object, the computer-implemented process restores the pile of objects to an original state with the selected object scrolled into view within a predefined display area.

According to another embodiment, a computer program product for a visual search comprises a computer recordable-type media containing computer executable program code stored thereon. The computer executable program code comprises computer executable program code for setting a transient mode on, computer executable program code for gathering objects to form a pile of objects, wherein each object has a predefined portion visible, computer executable program code for determining whether a selector is over the predefined portion of an object in the pile of objects, computer executable program code, responsive to a determination that the selector is detected over the predefined portion of the object in the pile of objects, for presenting the object in a foreground, computer executable program code for determining whether the object in the foreground is selected to form a selected object and computer executable program code, responsive to a determination that the object in the foreground is selected to form a selected object, for restoring the pile of objects to an original state with the selected object scrolled into view within a predefined display area.

According to another embodiment, an apparatus for a visual search comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to set a transient mode on, gather objects to form a pile of objects, wherein each object has a predefined portion visible, and determine whether a selector is over the predefined portion of an object in the pile of objects. Responsive to a determination that the selector is detected over the predefined portion of the object in the pile of objects, the processor unit executes the computer executable program code to direct the apparatus to present the object in a foreground and determine whether the object in the foreground is selected to form a selected object. Responsive to a determination that the object in the foreground is selected to form a selected object, the processor unit executes the computer executable program code to direct the apparatus to restore the pile of objects to an original state with the selected object scrolled into view within a predefined display area.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
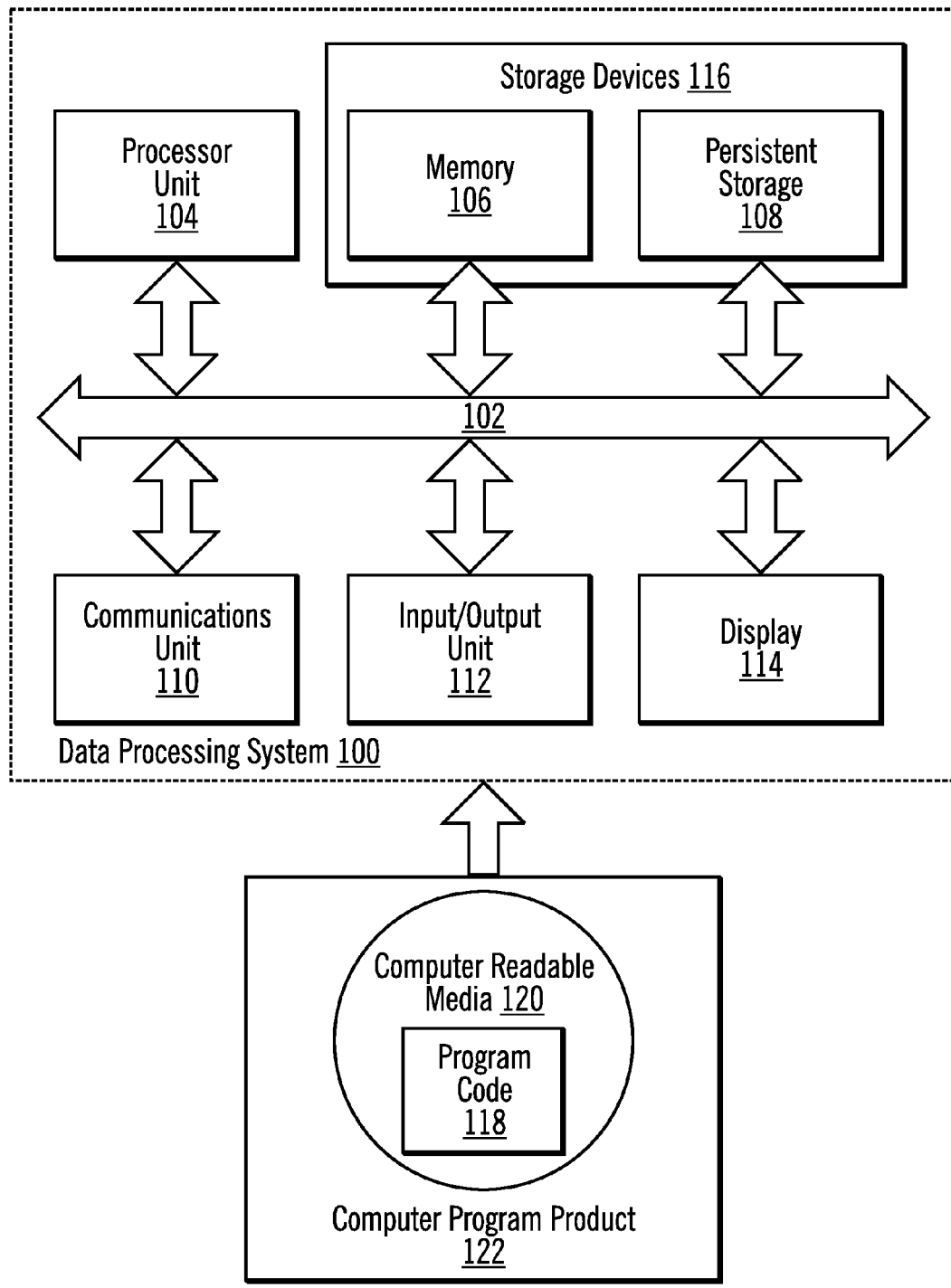
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as JAVA®, Smalltalk, C++, or the like and conventional procedural programming languages, such as the "C" programming language or similar programming languages. Embodiments of the disclosure may also be used with scripting languages including JAVASCRIPT™ and ACTIONSCRIPT® implementations associated with web browsers supporting mashup products. (JAVA, JAVASCRIPT, and all JAVA-based trademarks and logos are registered trademarks or common law marks of Oracle and/or its affiliates in the United States, other countries or both. ACTIONSCRIPT is a registered trademark or common law mark of Adobe Systems Incorporated in the United States and/or other countries.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for a visual search sets a transient mode on, gathers objects to form a pile of objects, wherein each object has a predefined portion visible and determines whether a selector is over the predefined portion of an object in the pile of objects. Responsive to a determination that the selector is detected over the predefined portion of the object in the pile of objects, the computer-implemented process presents the object in a foreground and determines whether the object in the foreground is selected to form a selected object. Responsive to a determination that the object in the foreground is selected to form a selected object, the computer-implemented process restores the pile of objects to an original state with the selected object scrolled into view within the predefined display area. The original state may be described as the state of the objects before the transient mode was set to on.

Using data processing system 100 of FIG. 1 as an example, an illustrative embodiment provides the computer-implemented process stored in memory 106, executed by processor unit 104, for a visual search. Processor unit 104 sets a transient mode on, gathers objects obtained from communications unit 110 or storage devices 116 to form a pile of objects, wherein each object has a predefined portion visible on display 114 and determines whether a selector is over the predefined portion of an object in the pile of objects. Responsive to a determination that the selector is detected over the predefined portion of the object in the pile of objects, processor unit 104 presents the object in a foreground of display 114 and determines whether the object in the foreground is selected to form a selected object. Responsive to a determination that the object in the foreground is selected to form a selected object, processor unit 104 restores the pile of objects to an original state with the selected object scrolled into view within the predefined display area of display 114.

In an alternative embodiment, program code 118 containing the computer-implemented process may be stored within computer readable media 120 as computer program product 122. In another illustrative embodiment, the process for a visual search may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
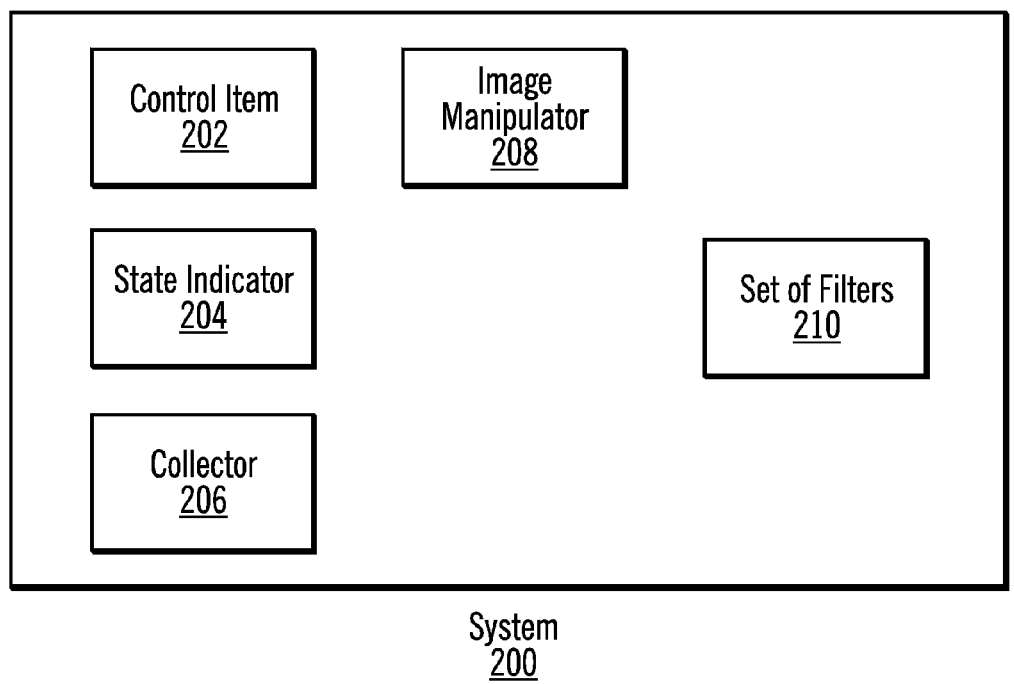
FIG. 2 is a block diagram of a system for visually searching for an object, in accordance with various embodiments of the disclosure.

With reference to FIG. 2, a block diagram of a system for visually searching for an object, in accordance with various embodiments of the disclosure is presented. System 200 is an example of a visual search system supported by components such as those of data processing system 100 of FIG. 1. In addition to the supporting components system 200 comprises a number of components including control item 202, state indicator 204, collector 206, image manipulator 208 and set of filters 210.

Control item 202 is used to activate the visual search process using system 200. Control item 202 in an exemplary embodiment may be typically implemented as a button on a tool bar of a user interface or as a context menu item.

State indicator 204 is a storage location containing a value, which indicates whether the transient state of a visual object search is in effect. State indicator 204 is used in conjunction with control item 202 to start or end a transient state for visual object searching.

Collector 206 provides a capability to organize a number of objects for display within a predefined display area of a user interface. Collector 206 in one exemplary embodiment gathers a number of objects of interest into a pile of objects suitable for performing a visually directed search. Collector 206 arranges the objects into a position within the bounds of the predefined display area while maintaining relative orientation among objects. An image representing an object may also represent a set of objects, which are related according to predefined criteria.

Image manipulator 208 provides a capability of modifying images of objects to be searched. Modification includes adding a hot spot portion to an image representing an object. Modification further includes assigning a transparency to an image enabling a user to view through an image being displayed to see another object below a top object. In another example, image manipulator 208 also provides a capability to create a thumbnail view of an object suitable for placement on the image of the respective object enabling a user to identify the object at a glance when the image of the object is only partially visible.

Set of filters 210 enables collector 204 to create the pile of objects containing only a defined subset of objects. For example, a filter may be selected to limit objects to a set containing report creation objects. Filtering for example is used to limit the number or type of objects for display within the predefined display area.

Illustrative embodiments of system 200 of the disclosure provide a capability for a transient mode enabling a user to fit all the widgets of a respective dashboard on the same screen, located in the same relative positions, but squashed together such that the widgets overlap, and providing a degree of transparency enabling the user to see through the widgets. Moving a mouse over a predefined portion of a widget brings the widget to the foreground, allowing the user to quickly flick through the widgets simply by moving the mouse. The selection process involves two clicks, one to invoke the transient mode, and another to select a specific widget after having brought a desired widget to the foreground. The transient nature is apparent because after the second click the dashboard returns to an original state, simply scrolled to the desired widget.

The illustrative embodiment of system 200 of the disclosure does not describe a method of arranging widgets in a stacked fashion; rather the widgets remain arranged in the same relative positions in which the widgets were arranged on the dashboard, simply closer together such that the widgets overlap. The temporary placement creates an effect of putting all widgets in a pile on the screen, somewhat like a pile of cards, not a stack of cards. Illustrative embodiments shown in system 200 provide a tool for visually searching through a large number of widgets, relying on quick recognition of a desired widget by a user, while maintaining previous relative positioning to help the user when the user knows an approximate area of the dashboard to view for the widget.

Illustrative embodiments of the disclosure describe a transient mode for visually finding widgets using minimal mouse clicks. In an illustrative embodiment of the disclosure when the user invokes a transient search mode for a collection of widgets in a mashup, the widgets are compressed onto the available space display space of the screen of the user interface such that the widgets each overlap, but leave a top left corner of each widget still visible as a hot spot. When the user rolls over the hot spot of the widget, the whole widget is shown to the user. The user can easily mouse over the corners of each widget, one after another, to glance at each widget. Once a desired widget is found, the user clicks the widget to form a selected widget, and all remaining widgets return to respective previous locations relative to one another. The mashup, however, is scrolled to the location of the selected widget.

Figure 3:
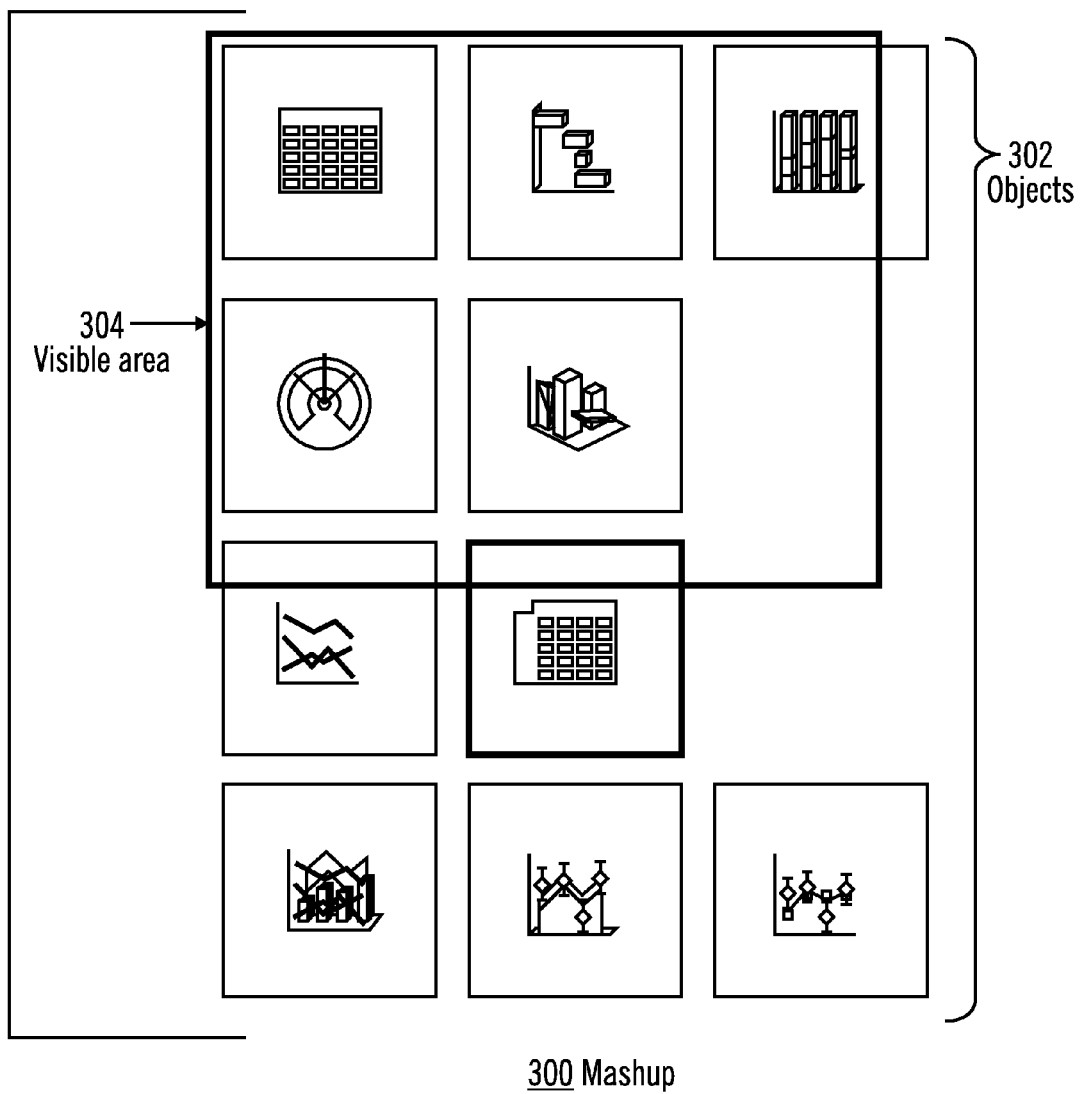
FIG. 3 is a block diagram of a mashup, using the system of FIG. 2 in accordance with one embodiment of the disclosure.

With reference to FIG. 3, a block diagram of a mashup, in accordance with one embodiment of the disclosure is presented. Mashup 300 is an example of using system 200 of FIG. 2 in an initial state.

Objects 302 represents a number of objects of available for searching visually by a user. Objects 302 typically represent more objects that can be displayed in original form within a display area of a user interface. Visible area 304 defines the display area available for user viewing. In original form objects 302 consumes more area than available. Typically a user would have to scroll the objects through the display to view all objects.

Figure 4:
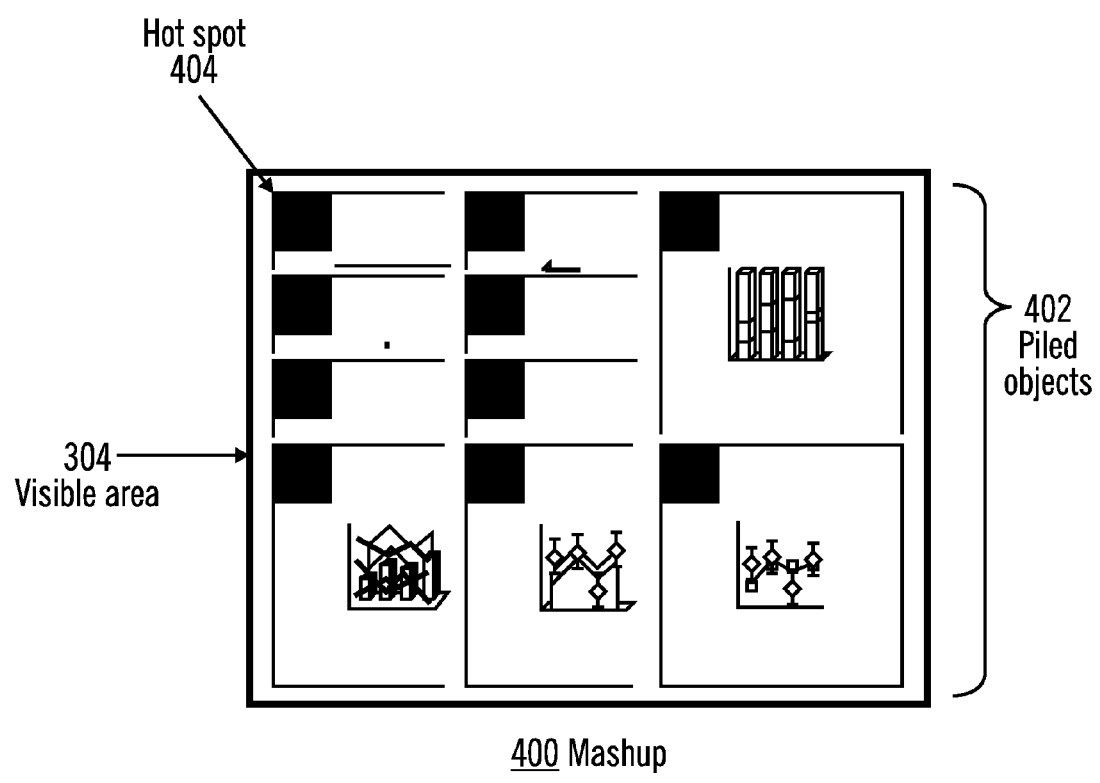
FIG. 4 is a block diagram of a mashup, using the system of FIG. 2 in accordance with one embodiment of the disclosure.

With reference to FIG. 4, a block diagram of a mashup, in accordance with one embodiment of the disclosure is presented. Mashup 400 is an example of using system 200 of FIG. 2 in a transient state.

Piled objects 402 represents a number of objects of available for searching visually by a user. Piled objects 402 represents the objects that can be displayed in a piled form within a display area of a user interface. Visible area 304 defines the display area available for user viewing as before. In original form objects 302 of FIG. 3 consumed more area than available. Piled objects 402 represent the placement of objects by collector 204 of system 200 of FIG. 2. The user invoked the visual search functionality through a gesture, for example a button on the toolbar, or a context menu item implementation of control item 202 also of system 200 of FIG. 2.

All the distances between widgets, piled objects 402, are reduced so the images can fit on one screen within visible area 304, but the relative direction of the images remain the same. The placement has the effect of compressing a dashboard onto the current screen. The widgets however do not change size. Each widget is also made to be slightly transparent so outlines of widgets underneath can be seen. Widgets, objects and images may be used interchangeably to represent the objects used. Widget is a term typically used with dashboards whereas an object is a more general term, either of which is represented as an image displayed in a user interface.

Hotspot 404 is added to a portion of a widget or object image during the collection process. The hotspot enables individual image selection by a user performing a visual search of the objects. In the example a hotspot is shown in an upper left corner of each image representing an object. Location of the hotspot within an image can vary.

Figure 5:
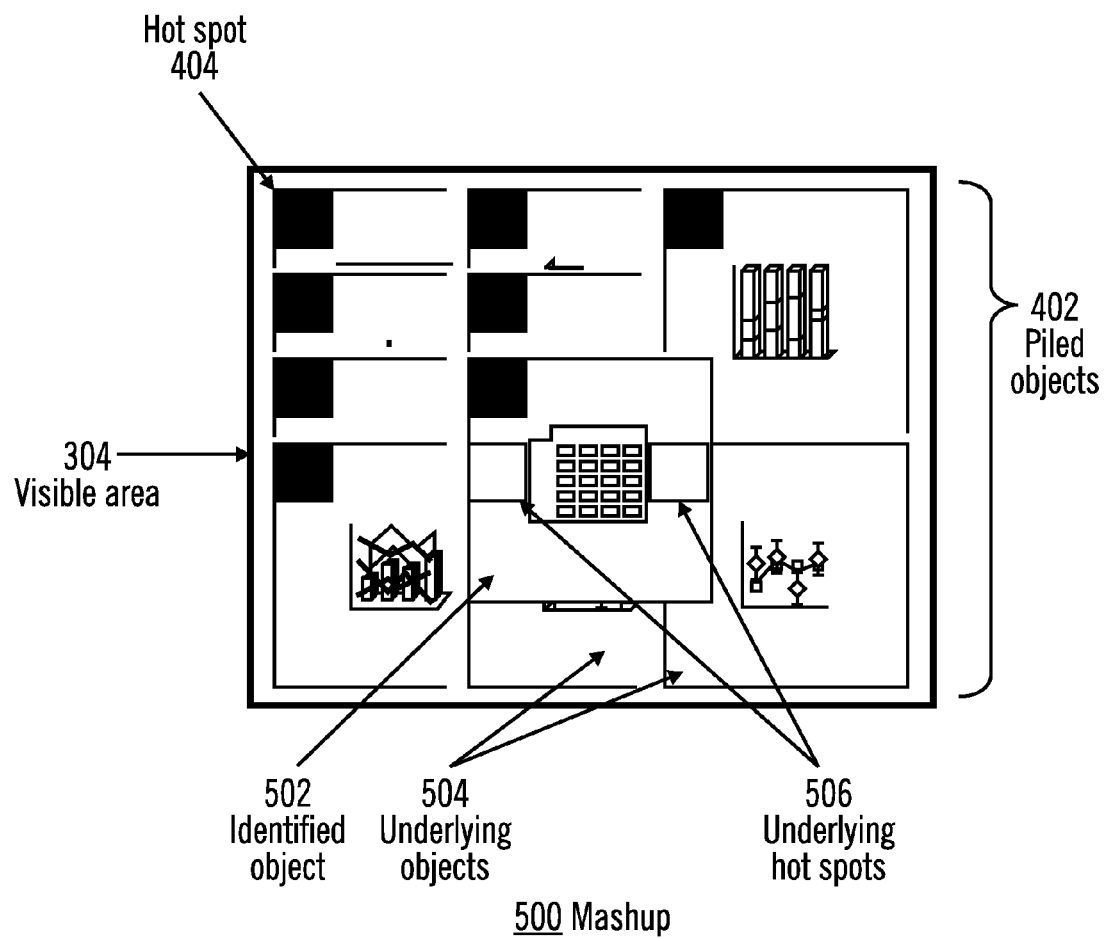
FIG. 5 is a block diagram of a mashup, using the system of FIG. 2 in accordance with one embodiment of the disclosure.

With reference to FIG. 5, a block diagram of a mashup, in accordance with one embodiment of the disclosure is presented. Mashup 500 is an example of using system 200 of FIG. 2 in an image identification phase of the transient state.

In an example using a dashboard, when a user traverses visible area 304 containing piled objects 402 and rolls a mouse over a hotspot of a widget, any widget that is placed behind another widget pops to the foreground when a top left corner is rolled over (or another hotspot on a portion of a widget could be used) to form identified object 502. The action also occurs when the top left corner of a widget is hidden behind another widget, such as the example of underlying objects 504. Underlying hotspots 506, (shown using light grey in contrast to the black of hotspot 404) of underlying objects 504, appear behind and through an overlay of a widget such as identified object 502 or other widget in a higher layer of piled objects 402. Widgets depicted in mashup 500 overlap, and providing a degree of transparency enables a user to see through the widgets. In this way the user can quickly move through all the widgets in the mashup.

When an object, such as identified object 502, contains other objects in a group, the group will open and be displayed in the foreground. Indicia may be placed on the image of an object containing other objects to indicate the presence of objects within. For example, identified object 502 may have a flag to indicate the object is a container of objects such as a set of report tools.

Figure 6:
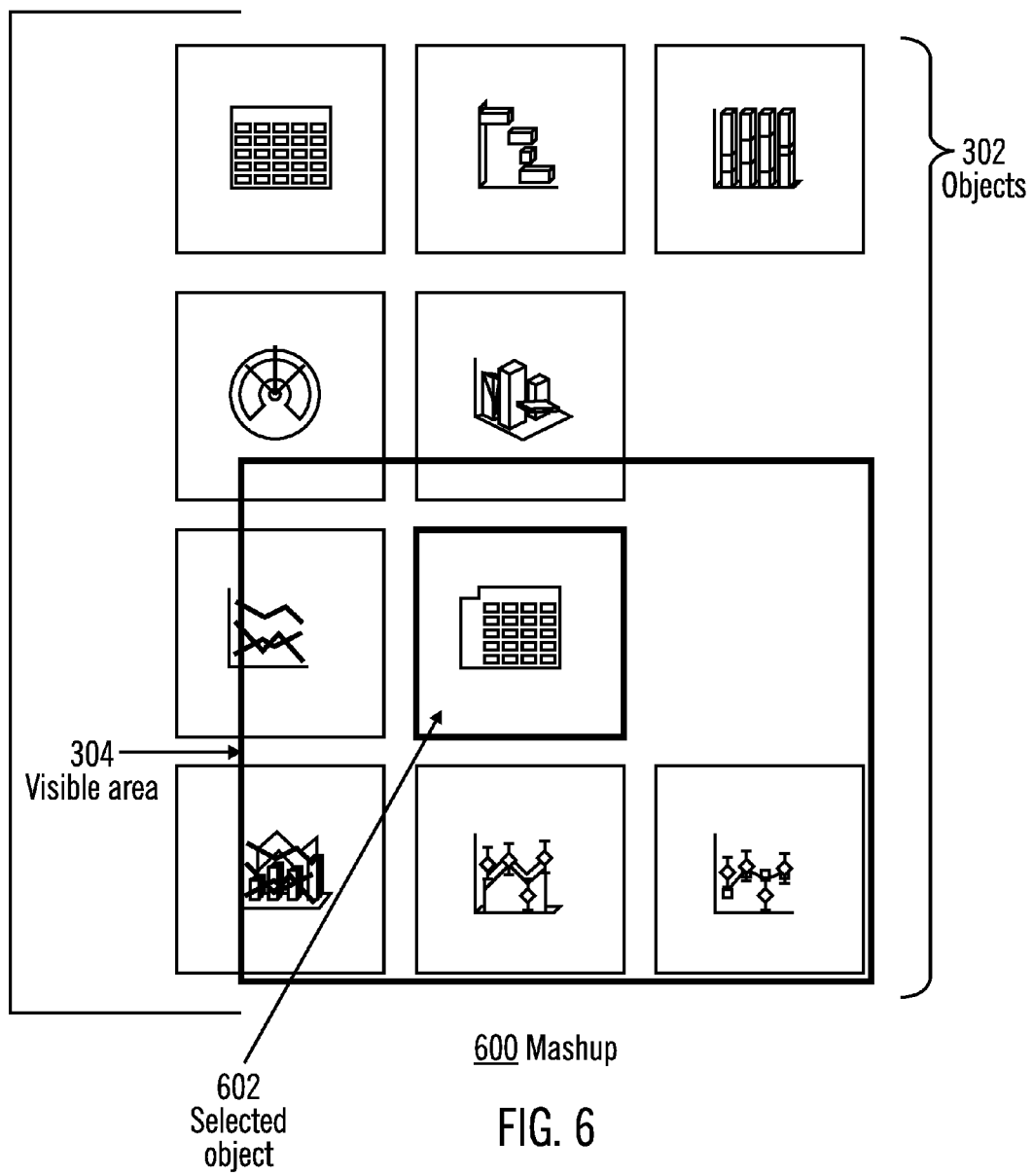
FIG. 6 is a block diagram of a mashup, using the system of FIG. 2 in accordance with one embodiment of the disclosure.

With reference to FIG. 6, a block diagram of a mashup, in accordance with one embodiment of the disclosure is presented. Mashup 600 is an example of using system 200 of FIG. 2 in a selected object phase.

When the user has found a desired widget, such as identified object 502 of FIG. 5 the user selects to form selected object 602. The mashup returns to a previous state, and the mashup is scrolled to the desired widget within visible area 304. Objects 302 are restored to the previous original state and no longer piled. Visible area 304 only displays a portion of objects available adjacent to selected object 602. The transient state is no longer in effect.

Figure 7:
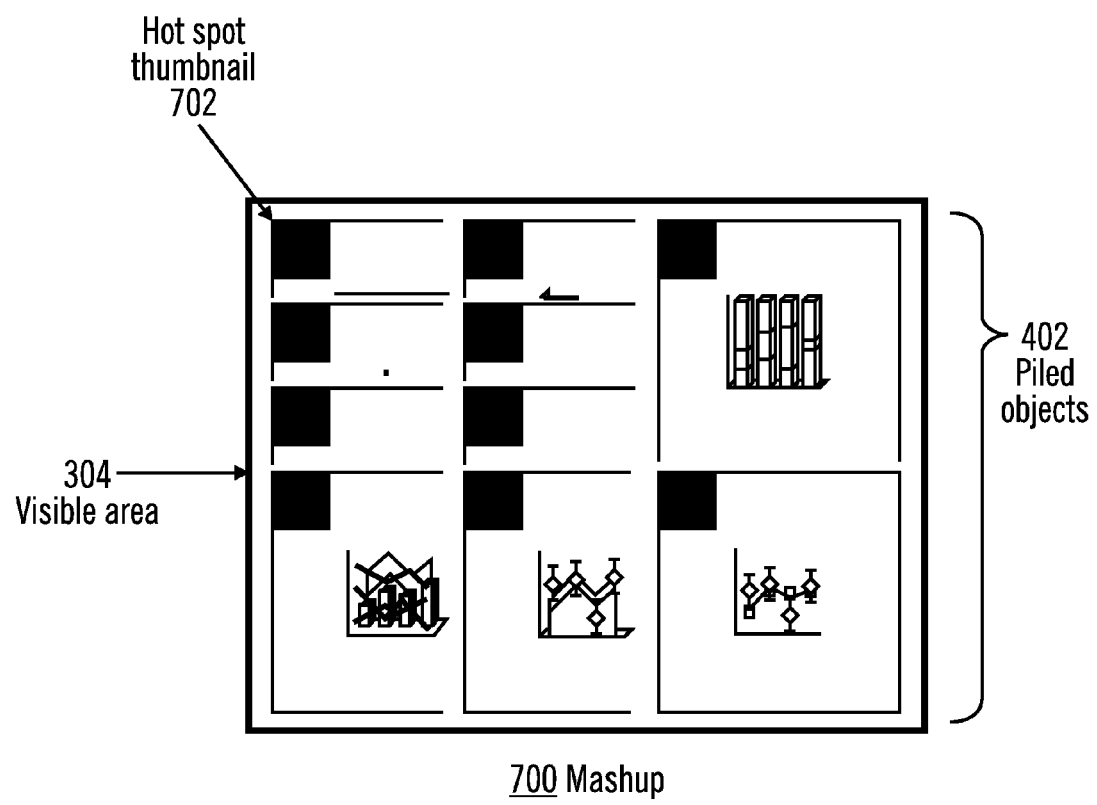
FIG. 7 is a block diagram of a mashup, using the system of FIG. 2 in accordance with one embodiment of the disclosure.

With reference to FIG. 7, a block diagram of a mashup, in accordance with one embodiment of the disclosure is presented. Mashup 700 is an example of using a thumbnail including a hotspot as in hot spot thumbnail 702.

Image manipulator 208 of system 200 of FIG. 2 optionally creates hot spot thumbnail 702 associated with each image. In the previous examples, thumbnails added to the top left corners of the widgets in the compressed mode help identify the widgets before a user rolls the mouse over the top left corner. The thumbnails provide a further visual cue to the user. Thumbnails may be generated when needed from information associated with a respective object or can be retrieved from a storage location.

Figure 8:
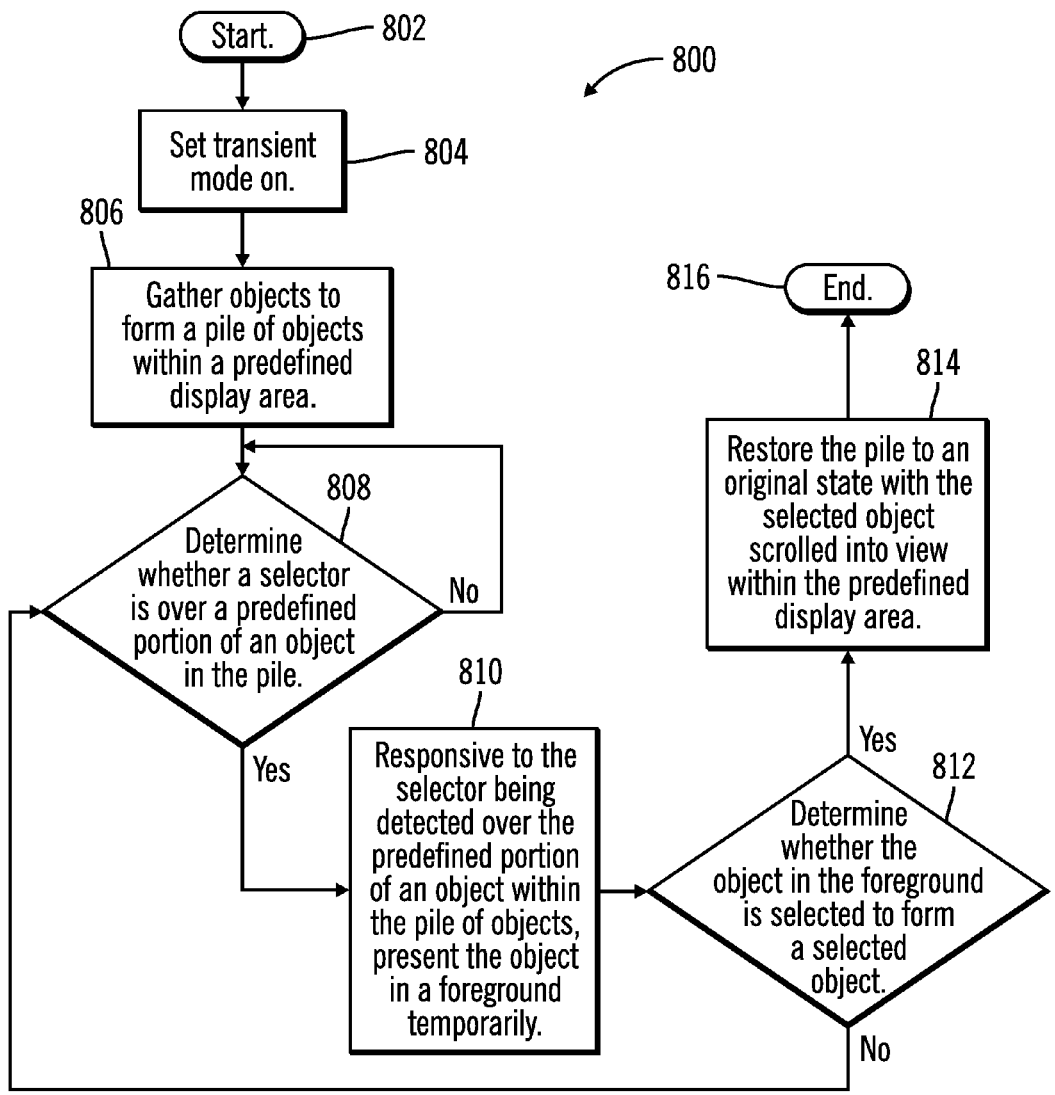
FIG. 8 is a flowchart of a visual search process using the system of FIG. 2 in accordance with one embodiment of the disclosure

With reference to FIG. 8, a flowchart of a visual search process in accordance with one embodiment of the disclosure is presented. Process 800 is an example using system 200 of FIG. 2.

Process 800 begins (block 802) and sets transient mode on (block 804). Transient mode is only used temporarily during the visual search process and is not intended to remain in effect for other periods.

Process 800 gathers objects to form a pile of objects within a predefined display area (block 806). The objects are available to the user and typically comprise a number of objects requiring a display capability in excess of the visible area of the display area available. The gather operation arranges the objects into a pile of objects without changing the size of the objects or the relative orientation of the objects. For example the objects are not resized nor are the objects arbitrarily arranged in a stack or cascading manner.

A determination is made as to whether a selector is over a predefined portion of an object in the pile (block 808). A selector is typical a mouse used in a roll over action to hover over a portion of an object, but may be another means including a stylus, finger or pointing device suitable for selecting an image of the user interface. A predefined portion of an object is typically a hot spot and may also include a thumbnail of the object to aid as visual cue. When a determination is made that a selector is not over a predefined portion of an object in the pile, process 800 loops back to perform block 808 as before.

Responsive to the selector being detected over the predefined portion of an object within the pile of objects, process 800 presents the object in a foreground of the predefined display area temporarily (block 810). The object is displayed in normal full size orientation on top, or the foreground, of other objects in the predefined display area. The object is displayed temporarily because the user has an option of choosing to use the identified object or another object from the pile.

A determination is made as to whether the object in the foreground is selected to form a selected object (block 812).

When a determination is made as that the object in the foreground is not selected to form a selected object, process 800 loops back to perform block 808 as before. When a determination is made as that the object in the foreground is selected to form a selected object, process 800 restores the pile to an original state with the selected object scrolled into view (block 814) and process 800 terminates thereafter (block 816). Restoring the pile to an original state ends the transient mode of the process. The objects revert to the physical layout present before the pile of objects was created.

Figure 9:
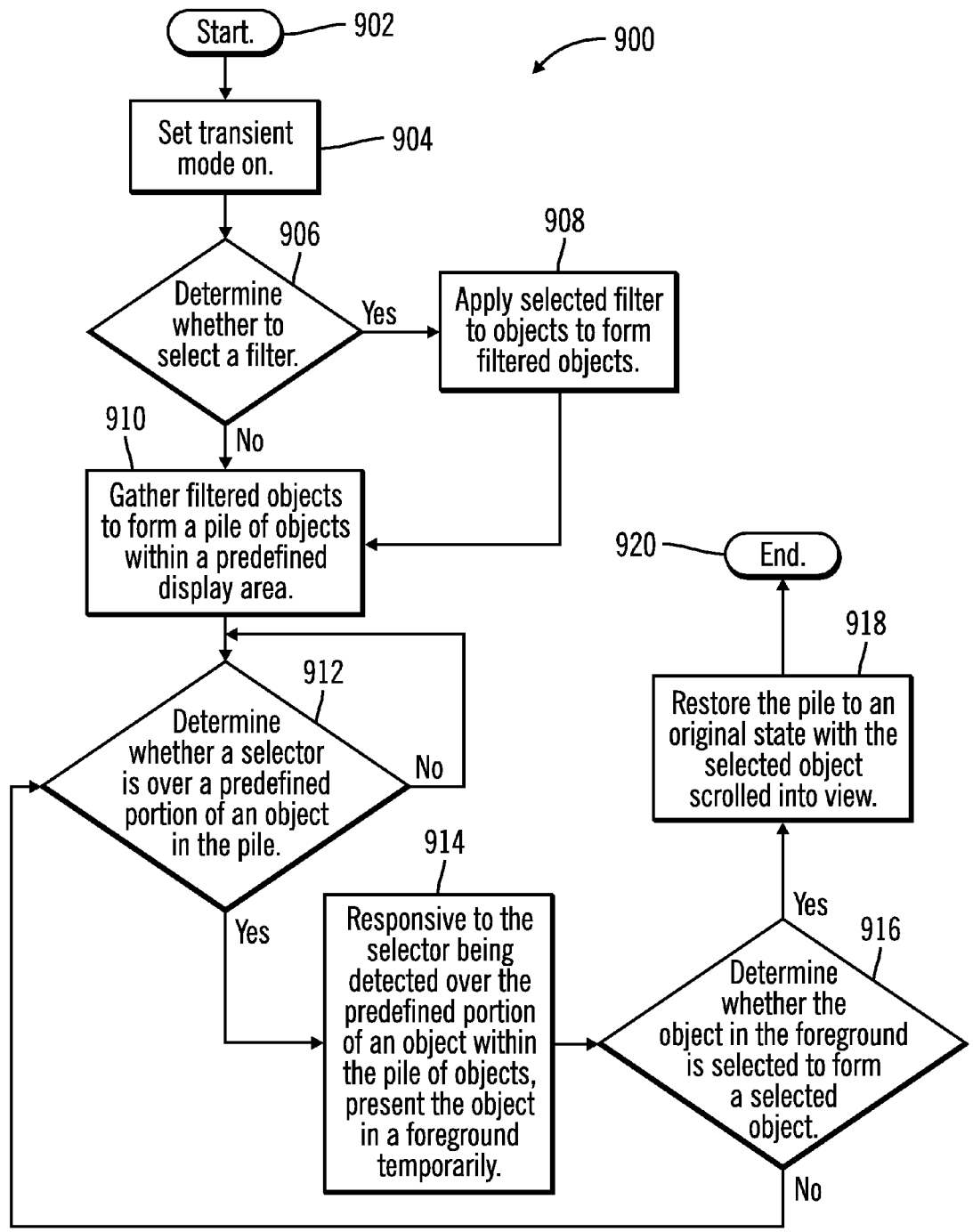
FIG. 9 is a flowchart of a variation of the visual search process of FIG. 8 in accordance with one embodiment of the disclosure.

With reference to FIG. 9, a flowchart of a visual search process in accordance with one embodiment of the disclosure is presented. Process 900 is an example using system 200 of FIG. 2 and is a variation of process 800 of FIG. 8.

Process 900 begins (block 902) and sets transient mode on (block 904). Transient mode is only used temporarily during the visual search process and is not intended to remain in effect for other periods.

Process 900 differs from process 800 of FIG. 8 by offering a capability to filter objects by determining whether to select a filter (block 906). When a determination is made to select a filter, process 900 applies a selected filter to objects to form filtered objects (block 908). From block 908, processing continues to block 910.

Process 900 gathers the filtered objects to form a pile of objects within a predefined display area (block 910). The objects are available to the user and typically comprise a number of objects requiring a display capability in excess of the visible area of the display area available. The gather operation arranges the filtered subset of available objects into a pile of filtered objects without changing the size of the objects or the relative orientation of the objects. For example the objects are not resized nor are the objects arbitrarily rearranged in a stack or cascading manner.

A determination is made as to whether a selector is over a predefined portion of an object in the pile (block 912). A selector is typical a mouse used in a roll over action to hover over a portion of an object, but may be another means including a stylus, finger or pointing device suitable for selecting an image of the user interface. A predefined portion of an object is typically a hot spot and may also include a thumbnail of the object to aid as visual cue. When a determination is made that a selector is not over a predefined portion of an object in the pile, process 900 loops back to perform block 912 as before.

Responsive to the selector being detected over the predefined portion of an object within the pile of objects, process 900 presents the object in a foreground of the predefined display area temporarily (block 914). The object is displayed in normal full size orientation on top, or the foreground, of other objects in the predefined display area. The object is displayed temporarily because the user has an option of choosing to use the identified object or another object from the pile.

A determination is made as to whether the object in the foreground is selected to form a selected object (block 916). When a determination is made as that the object in the foreground is not selected to form a selected object, process 900 loops back to perform block 912 as before. When a determination is made as that the object in the foreground is selected to form a selected object, process 900 restores the pile to an original state with the selected object scrolled into view (block 918) and process 900 terminates thereafter (block 920). Restoring the pile to an original state ends the transient mode of the process. The objects revert to the physical layout present before the pile of filtered objects was created.

Figure 10:
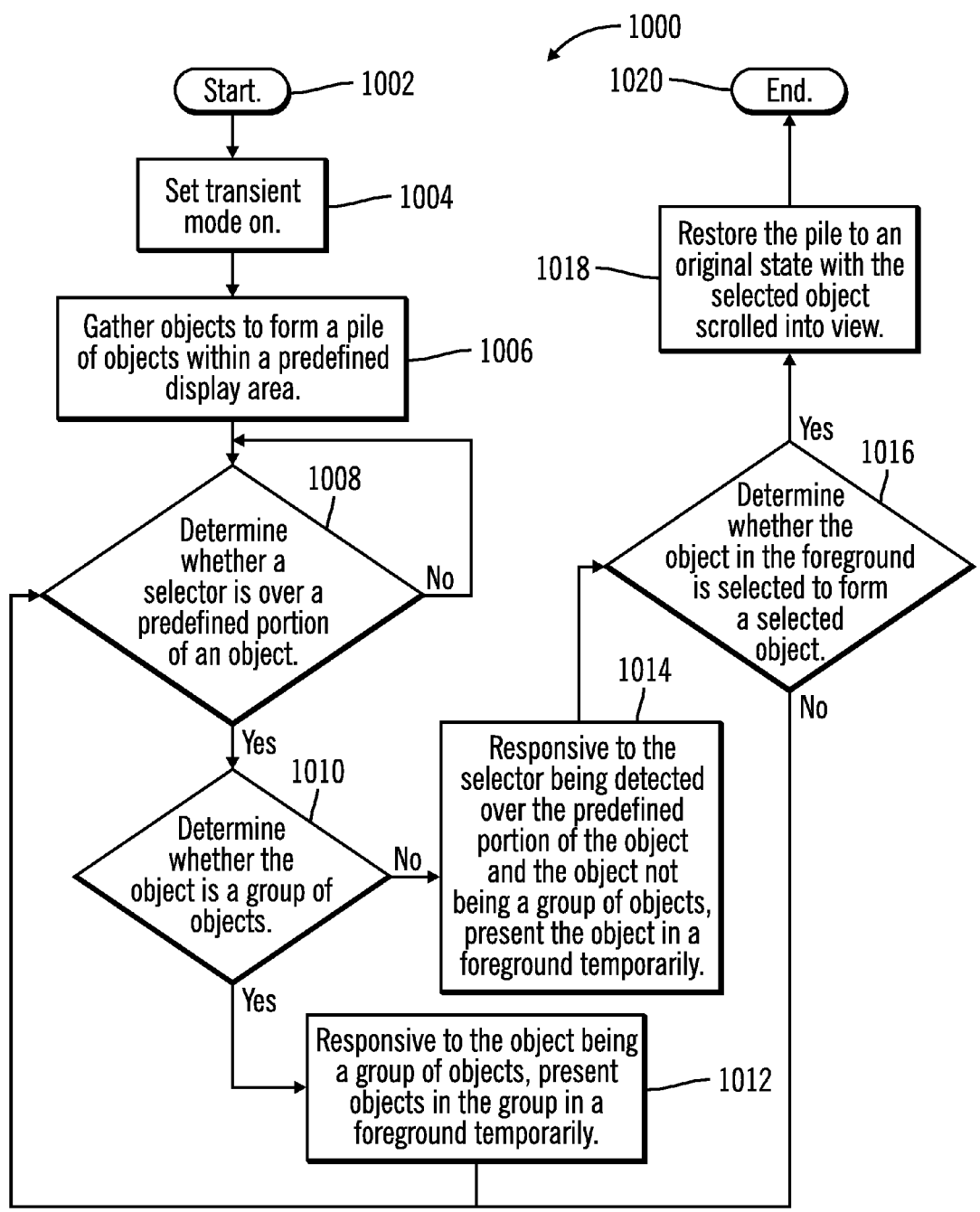
FIG. 10 is a flowchart of a variation of the visual search process FIG. 8 in accordance with one embodiment of the disclosure.

With reference to FIG. 10, a flowchart of a visual search process in accordance with one embodiment of the disclosure is presented. Process 1000 is an example using system 200 of FIG. 2 and is a variation of process 800 of FIG. 8. Process 1000 may also be viewed as a variant of process 900 of FIG. 9. The various processes of process 800, process 900 and process 1000 may also be combined.

Process 1000 begins (block 1002) and sets transient mode on (block 1004). Transient mode is only used temporarily during the visual search process and is not intended to remain in effect for other periods.

Process 1000 differs from process 800 of FIG. 8 by offering a capability to use objects containing other objects. Process 1000 gathers the filtered objects to form a pile of objects within a predefined display area (block 1006). The objects are available to the user and typically comprise a number of objects requiring a display capability in excess of the visible area of the display area available. The gather operation arranges the filtered subset of available objects into a pile of filtered objects without changing the size of the objects or the relative orientation of the objects. For example the objects are not resized nor are the objects arbitrarily rearranged in a stack or cascading manner.

A determination is made as to whether a selector is over a predefined portion of an object in the pile (block 1008). A selector is typical a mouse used in a roll over action to hover over a portion of an object, but may be another means including a stylus, finger or pointing device suitable for selecting an image of the user interface. A predefined portion of an object is typically a hot spot and may also include a thumbnail of the object to aid as visual cue. When a determination is made that a selector is not over a predefined portion of an object in the pile, process 1000 loops back to perform block 1008 as before.

Responsive to the selector being detected over the predefined portion of an object within the pile of objects, process 1000 determines whether the object is a group of objects (block 1010). For example, process 1000 may make a determination using an indicia in a property file associated with the object.

When a determination is made that the object is a group of objects, process 1000 presents the objects in the group of objects in a foreground of the predefined display area temporarily (block 1012). From block 1012, process 1000 loops back to perform block 1008 as before. When a determination is made that the object is not a group of objects, process 1000 presents the object in a foreground of the predefined display area temporarily (block 1014). The object is displayed in normal full size orientation on top, or the foreground, of other objects in the predefined display area. The object is displayed temporarily because the user has an option of choosing to use the identified object or another object from the pile.

A determination is made as to whether the object in the foreground is selected to form a selected object (block 1016). When a determination is made as that the object in the foreground is not selected to form a selected object, process 1000 loops back to perform block 1008 as before. When a determination is made as that the object in the foreground is selected to form a selected object, process 1000 restores the pile to an original state with the selected object scrolled into view (block 1018) and process 900 terminates thereafter (block 1020). Restoring the pile to an original state ends the transient mode of the process. The objects revert to the physical layout present before the pile of filtered objects was created.

Thus in one illustrative embodiment a computer-implemented process for a visual search, sets a transient mode on, gathers objects to form a pile of objects, wherein each object has a predefined portion visible and determines whether a selector is over the predefined portion of an object in the pile of objects. Responsive to a determination that the selector is detected over the predefined portion of the object in the pile of objects, the computer-implemented process present the object in a foreground and determine whether the object in the foreground is selected to form a selected object. Responsive to a determination that the object in the foreground is selected to form a selected object, the computer-implemented process restore the pile of objects to an original state with the selected object scrolled into view within the predefined display area.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for a visual search, the computer-implemented process comprising:
    displaying some objects in an original state separately from each other within a predefined display area with at least one of the objects not displayed within the predefined display area;
    setting a transient mode on to temporarily display more of the objects within the predefined display area by forming a pile of transparent, overlapping objects that include the at least one of the objects not previously displayed within the predefined display area, that are located in same relative positions as in the original state, and that each has a predefined portion visible;
    determining whether a selector is over the predefined portion of an object in the pile of objects;
    responsive to a determination that the selector is detected over the predefined portion of the object in the pile of objects, presenting the object in a foreground;
    determining whether the object in the foreground is selected to form a selected object;
    responsive to a determination that the object in the foreground is selected to form a selected object,
        restoring the pile of objects to the original state with the selected object scrolled into view within the predefined display area with at least one of the objects that was previously displayed not displayed within the predefined display area; and
        setting the transient mode off.

2. The computer-implemented process of claim 1, wherein forming the pile of objects further comprises:
    determining whether to select a filter;
    responsive to a determination to select a filter, applying a selected filter to objects to form filtered objects; and
    gathering the filtered objects to form a pile of objects.

3. The computer-implemented process of claim 1, wherein forming the pile of objects further comprises:
  maintaining a size of each object;
  maintaining orientation and proximity relationship among objects; and
  modifying each object to add transparency enabling one object to be seen below another.

4. The computer-implemented process of claim 1, wherein responsive to the determination that the selector is detected over the portion of the object in the pile of objects, presenting the object in the foreground further comprises:
  determining whether the object is a group of objects; and
  responsive to a determination that the object is a group of objects, presenting objects in the group of objects in the foreground.

5. The computer-implemented process of claim 1, wherein presenting the object in the foreground further comprises:
  presenting the object in the foreground temporarily.

6. The computer-implemented process of claim 1, wherein setting the transient mode on further comprises:
  selecting one of a menu context item and a graphic representation of a control in a user interface.

7. A computer program product for a visual search, the computer program product comprising:
  a non-transitory computer-readable storage medium containing computer executable program code stored thereon, the computer executable program code comprising:
  computer executable program code for displaying some objects in an original state separately from each other within a predefined display area with at least one of the objects not displayed within the predefined display area;
  computer executable program code for setting a transient mode on to temporarily display more of the objects within the predefined display area by forming a pile of transparent, overlapping objects that include the at least one of the objects not previously displayed within the predefined display area, that are located in same relative positions as in the original state, and that each has a predefined portion visible;
  computer executable program code for determining whether a selector is over the predefined portion of an object in the pile of objects;
  computer executable program code, responsive to a determination that the selector is detected over the predefined portion of the object in the pile of objects, for presenting the object in a foreground;
  computer executable program code for determining whether the object in the foreground is selected to form a selected object;
  computer executable program code, responsive to a determination that the object in the foreground is selected to form a selected object, for
    restoring the pile of objects to the original state with the selected object scrolled into view within the predefined display area with at least one of the objects that was previously displayed not displayed within the predefined display area; and
    setting the transient mode off.

8. The computer program product of claim 7, wherein computer executable program code for forming the pile of objects further comprises:
  computer executable program code for determining whether to select a filter;
  computer executable program code responsive to a determination to select a filter, for applying a selected filter to objects to form filtered objects; and
  computer executable program code for gathering the filtered objects to form a pile of objects.

9. The computer program product of claim 7, wherein computer executable program code for forming the pile of objects further comprises:
  computer executable program code for maintaining a size of each object;
  computer executable program code for maintaining orientation and proximity relationship among objects; and
  computer executable program code for modifying each object to add transparency enabling one object to be seen below another.

10. The computer program product of claim 7, wherein computer executable program code, responsive to the determination that the selector is detected over the portion of the object in the pile of objects, for presenting the object in the foreground further comprises:
  computer executable program code for determining whether the object is a group of objects; and
  computer executable program code responsive to a determination that the object is a group of objects, for presenting objects in the group of objects in the foreground.

11. The computer program product of claim 7, wherein computer executable program code for presenting the object in the foreground further comprises:
  computer executable program code for presenting the object in the foreground temporarily.

12. The computer program product of claim 7, wherein computer executable program code for setting the transient mode on further comprises:
  computer executable program code for selecting one of a menu context item and a graphic representation of a control in a user interface.

13. An apparatus for a visual search, the apparatus comprising:
  storage device connected to a communications fabric, wherein the storage device contains computer executable program code; and
  a processor unit connected to the storage device, wherein the processor unit executes the computer executable program code to direct the apparatus to:
  display some objects in an original state separately from each other within a predefined display area with at least one of the objects not displayed within the predefined display area;
  set a transient mode on to temporarily display more of the objects within the predefined display area by forming a pile of transparent, overlapping objects that include the at least one of the objects not previously displayed within the predefined display area, that are located in same relative positions as in the original state, and that each has a predefined portion visible;
  determine whether a selector is over the predefined portion of an object in the pile of objects;
  responsive to a determination that the selector is detected over the predefined portion of the object in the pile of objects, present the object in a foreground;
  determine whether the object in the foreground is selected to form a selected object;
  responsive to a determination that the object in the foreground is selected to form a selected object,
    restore the pile of objects to the original state with the selected object scrolled into view within the predefined display area with at least one of the objects that was previously displayed not displayed within the predefined display area; and
  set the transient mode off.

14. The apparatus of claim 13, wherein the processor unit executes the computer executable program code to direct the apparatus to form the pile of objects further directs the apparatus to:
  determine whether to select a filter;
  responsive to a determination to select a filter, apply a selected filter to objects to form filtered objects; and
  gather the filtered objects to form a pile of objects.

15. The apparatus of claim 13, wherein the processor unit executes the computer executable program code to direct the apparatus to form the pile of objects and further directs the apparatus to:
  maintain a size of each object;
  maintain orientation and proximity relationship among objects; and
  modify each object to add transparency enabling one object to be seen below another.

16. The apparatus of claim 13, wherein the processor unit executes the computer executable program code to direct the apparatus, responsive to the determination that the selector is detected over the portion of the object in the pile of objects, to present the object in the foreground further directs the apparatus to:
  determine whether the object is a group of objects; and
  responsive to a determination that the object is a group of objects, present objects in the group of objects in the foreground.

17. The apparatus of claim 13, wherein the processor unit executes the computer executable program code to direct the apparatus to present the object in the foreground and further directs the apparatus to:
  present the object in the foreground temporarily.

18. The apparatus of claim 13, wherein the processor unit executes the computer executable program code to direct the apparatus to restore the pile of objects to an original state and further directs the apparatus to:
  select one of a menu context item and a graphic representation of a control in a user interface.

\* \* \* \* \*